Dec. 22, 1959            S. S. KAHN            2,917,966
SHEET METAL LANCED NUT HAVING ALTERNATELY
OFFSET V-SHAPED STRAPS
Filed Jan. 28, 1957
FIG. 1.
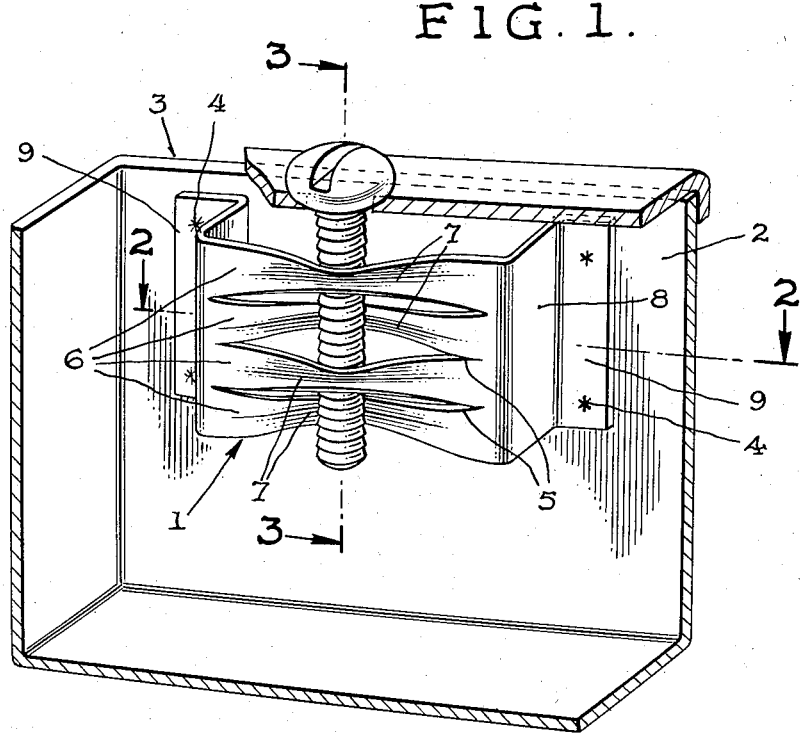
FIG. 2.
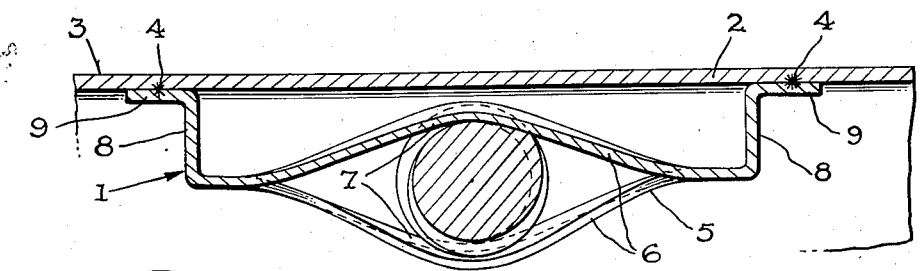
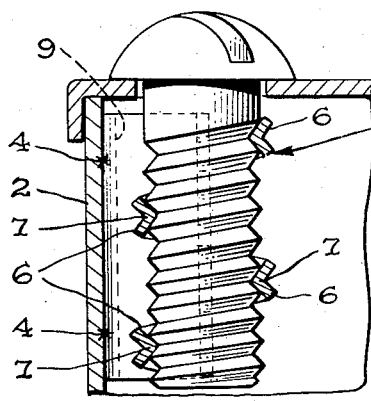
FIG. 3.
INVENTOR
SIMON S. KAHN
BY
ATTORNEYS United States Patent Office 2,917,966
Patented Dec. 22, 1959

2,917,966

SHEET METAL LANCED NUT HAVING ALTERNATELY OFFSET V-SHAPED STRAPS

Simon S. Kahn, Glen Ridge, N.J., assignor to General American Transportation Corporation, Chicago, Ill., a corporation of New York Application January 28, 1957, Serial No. 636,693

2 Claims. (Cl. 85—32)

The present invention relates to sheet metal articles, and more particularly to both tapped and non-tapped lanced, sheet metal, screw-receiving fasteners or nuts.

In many products manufactured of sheet metal, it is frequently necessary to provide lugs, webs or other appendages of one kind or another for the attachment of supplementary components, covers, access plates or the like.

A common means for providing screw anchorage for heavy loading is to impress louvres or so-called lanced webs in the sheet metal structure so as to provide engagement for a suitable fastening means such as a self-tapping screw. The forming of said louvres or lanced webs requires the use of special dies, and their formation may oftentimes be required after the assembly is in production. In some cases, it may be found that the lancing may have to be located in places which are difficult or impossible to get to, and thus the cost of performing this operation is very often excessive or prohibitive.

Accordingly, it is an object of the present invention to provide standardized, pre-formed, lanced sheet metal, screw-receiving sockets or nuts of unitary form which may be quickly fastened in any desired position by any suitable means such as rivets, spot welding or the like.

Another object of the invention is to provide fasteners that may be simply and inexpensively produced from flat material such as strips or other sheet metal, and which are so formed as to be capable of receiving either self-tapping screws or standard machine screws.

Other objects and advantages of the invention will be hereinafter described and the novel features thereof defined in the appended claims.

In the drawings:

Fig. 1 is a perspective view of one form of lanced fastener shown in one typical use;

Fig. 2 is a horizontal cross-section as seen on line 2—2 of Fig. 1; and

Fig. 3 is a vertical cross-section as seen on line 3—3 of Fig. 1, with the screw being shown in full elevation.

Like reference characters designate corresponding parts throughout the several views of the drawings.

Referring to Figs. 1–3, there is shown the one form of lanced fastener generally designated 1, which is suitably fastened to a wall 2 of a sheet metal box 3, as by spot welding indicated at 4. Although the form of this fastener is specifically shown secured to a side wall of a sheet metal box or the like and serving to retain the cover by suitable screws, it is understood that said fastener may take the form of numerous different shapes as the particular use may dictate, for example, being formed to fit into corners and/or other desired places, as well as serving numerous functions other than merely retaining a cover plate.

The fastener 1 is fabricated from a sheet metal blank of predetermined size having a plurality of parallel lanced slits 5 cut therein horizontally or on an equivalent angle of the pitch of a machine screw and thereby forming lanced webs, straps or louvre members 6. Said slits terminate intermediate the side or end portions of said blank, leaving integral end areas with which to form fastening or mounting lugs or ears. The respective lanced strap members 6 are pressed out in alternate directions, so that every other one aligns with the one previously formed.

The louvres are creased lengthwise as shown in the drawings, so that their transverse cross-section in the middle zone thereof is of approximately V-shape as at 7, as best seen in Fig. 3. The alternate louvres are creased or "V-ed" in opposite directions so that the crests of adjacent strap member 6 face each other and so angled when pressed out of the plane of the blank in their respective opposite directions that they will mate with the screw pitch of the particular screw thread size for which it is used. In the drawings, the "V-ed" louvres have been drawn on a somewhat enlarged scale for clarity, and therefore are shown as engaging the opposite valleys of every other screw thread. It is to be understood that the individual louvres may be made of smaller area so as to engage the opposite valley of each adjacent thread. As illustrated, the opposite extremities 8 of the fastener are suitably bent or formed to the required shape for mounting, as for example, in the form of flanged ears 9.

It is to be further understood that the fastener may be used with self-tapping screws of appropriate size, as well as with machine screws, by suitably conforming the same to the pitch and the diameter of the particular screw.

Lanced or louvred sheet-metal nuts or screw retaining articles have definite advantages over ordinary or conventional sheet metal stamped nuts inasmuch as the threading engagement is far greater, hence, affording greater resistance to thread stripping.

It will be apparent to those skilled in the art that by the construction illustrated in the accompanying drawings and described above, there is provided an illustrative form of inexpensive, simple and effective machine screw and/or self-tapping screw retainer or nut for use in constructions of many kinds. In addition to use with sheet metal products, the invention may readily be adapted for uses such as inserts in molded plastic articles, or may be provided with anchor prongs for driving into wooden assemblies and the like.

While the specific details of the invention have been shown and described herein, other changes and alterations may be resorted to without departing from the spirit and scope thereof as defined in the appended claims.

I claim:

1. A unitary screw-retaining article of the class described, comprising a body of sheet material having a plurality of substantially parallel lanced perforations through substantially its longitudinal center and defining substantially parallel straps intermediate each adjacent pair of perforations, said straps being creased longitudinally into a transverse V-shape intermediate their ends, with each strap being creased in a direction opposite to the adjacent one and with the crests of adjacent straps facing each other, and said straps being arcuately and alternately offset in opposite directions to define a socket for engagement with the threads of a screw.

2. An article as defined in claim 1, wherein the socket is formed substantially parallel with the side extremities of said body, and said side extremities are provided with winged mounting flanges.

(References on following page)

References Cited in the file of this patent

UNITED STATES PATENTS

| | | | |
|---|---|---|---|
| 1,363,353 | Riker | Dec. 28, | 1920 |
| 1,994,428 | Keil | Mar. 12, | 1935 |
| 2,130,243 | Mitchell | Sept. 13, | 1938 |
| 2,130,399 | Rypinski | Sept. 20, | 1938 |
| 2,230,916 | Tinnerman | Feb. 4, | 1941 |
| 2,818,764 | Switzer | Jan. 7, | 1958 |

FOREIGN PATENTS

| 640,285 | Germany | Dec. 29, 1936 |
|---|---|---|